(12) United States Patent
Müller et al.

(10) Patent No.: US 7,572,323 B2
(45) Date of Patent: Aug. 11, 2009

(54) FLUID SEPARATING DEVICE

(75) Inventors: Jens Müller, München (DE); Volker Harbusch, München (DE); Markus Huber, München (DE); Christian Böhm, Siegertsbrunn (DE); Kurt Rothkopf, München (DE); Manfred Stefener, München (DE)

(73) Assignee: SFC Smart Fuel Cell AG, Brunnthal-Nord (DE)

( * ) Notice: Subject to any disclaimer, the term of this patent is extended or adjusted under 35 U.S.C. 154(b) by 619 days.

(21) Appl. No.: 10/520,130

(22) PCT Filed: May 19, 2003

(86) PCT No.: PCT/EP03/05254

§ 371 (c)(1),
(2), (4) Date: Aug. 22, 2005

(87) PCT Pub. No.: WO2004/004043

PCT Pub. Date: Jan. 8, 2004

(65) Prior Publication Data
US 2006/0081130 A1 Apr. 20, 2006

(30) Foreign Application Priority Data
Jul. 1, 2002 (EP) .................................. 02014558

(51) Int. Cl.
*B01D 53/34* (2006.01)
*B01D 47/00* (2006.01)
*G05D 7/00* (2006.01)
*G05D 9/00* (2006.01)

(52) U.S. Cl. ............................... 96/290; 96/24; 96/211; 96/245; 96/291; 261/106; 423/220; 423/226; 423/228; 423/229; 423/232

(58) Field of Classification Search ............... 96/296, 96/245, 290, 24, 211; 95/24, 211; 423/220, 423/232, 233; 261/106
See application file for complete search history.

(56) References Cited

U.S. PATENT DOCUMENTS

| 2,198,305 | A | * | 4/1940 | Crawford ..................... 261/97 |
| 3,160,527 | A | * | 12/1964 | Hess ........................... 429/41 |
| 3,565,575 | A | * | 2/1971 | Warshaw ..................... 423/235 |
| 4,491,566 | A | * | 1/1985 | Adams et al. ............... 423/220 |
| 5,837,393 | A | * | 11/1998 | Okamoto ..................... 429/20 |
| 6,048,383 | A | * | 4/2000 | Breault et al. .................. 95/44 |
| 6,110,613 | A | * | 8/2000 | Fuller .......................... 429/17 |
| 6,238,464 | B1 | * | 5/2001 | Dullien ....................... 95/282 |
| 6,338,786 | B1 | * | 1/2002 | Thorpe et al. ............... 205/628 |
| 7,314,509 | B2 | * | 1/2008 | Speranza et al. ............. 96/155 |
| 2002/0106549 | A1 | * | 8/2002 | Cooper et al. ................. 429/40 |

FOREIGN PATENT DOCUMENTS

| CA | 2451118 C | 1/2003 |
| JP | 2002045625 | 2/2002 |
| WO | WO-9910714 | 3/1999 |
| WO | WO-9946032 | 9/1999 |

* cited by examiner

*Primary Examiner*—Frank M Lawrence
*Assistant Examiner*—Ives Wu
(74) *Attorney, Agent, or Firm*—IP Strategies

(57) ABSTRACT

The invention relates to a fluid separating device with a lower section with a fluid feeding device and a liquid discharging device, an upper section with a fluid feeding device and a gas discharging device, a contact device which is constructed in such a manner that gas, which rises from the lower section into the upper section, comes into contact with liquid which sinks from the upper section into the lower section. Thereby, the rising gases can be depleted of components which are soluble in said liquid. Furthermore, a measuring device for determining the quantity of liquid and/or the alterations thereof is provided.

15 Claims, 3 Drawing Sheets

FLUID SEPARATING DEVICE

FIELD OF THE INVENTION

The invention relates to a fluid separating device for separating gases and liquids in several fluid flows and for separating liquid-soluble components from the gases. The device comprises a lower section with a fluid feeding device and a liquid discharging device, an upper section with a fluid feeding device and a gas discharging device, a contact device which is constructed in such a manner that gas which rises from the lower section to the upper section comes into contact with liquid which sinks from the upper section into the lower section, and a measuring device for determining the quantity of liquid and/or alterations of the quantity of liquid in the lower section.

The fluid separating device according to the invention is particularly suited for controlling the fluid flows in fuel cell systems, in particular in DMFC systems.

BACKGROUND OF THE INVENTION

In some fuel cells, instead of a pure fuel component, diluted fuel is used which will be designated below as fuel mixture, even if not all components of this mixture are oxidisable substances.

In a direct methanol fuel cell (DMFC), the fuel mixture on the anode side consists, for example, of methanol dissolved in water, the first being the actual fuel. The water of this fuel mixture does not appear in the net accounting equation of the cell reaction, as distinguished from the water arising as reaction product (on the cathode side), which has to be discharged from the cell as the reaction product carbon dioxide arising on the anode side. That is, the anode fluid undergoes a depletion of methanol and an enrichment of $CO_2$ on its path from the anode inlet to the anode outlet. In order to be able to optimally utilize the depleted anode fluid, too, and to avoid liquid losses, as a rule, a circuit flow is provided on the anode side, wherein the anode fluid is again enriched with fuel (corresponding to its consumption) after it has left the anode outlet and fed to the anode inlet again. In the process, however, carbon dioxide has to be discharged from the circuit flow.

In the DMFC system, the major proportion of carbon dioxide is present in a gaseous form as the solubility limit of carbon dioxide in the fuel mixture is quickly exceeded. (As water is quantitatively the dominant substance in the fuel mixture, the solubility limit of carbon dioxide in the fuel mixture approximately corresponds to that of carbon dioxide in water.) That is, the fluid exiting at the anode outlet is as a rule no homogenous phase but a gas/liquid mixture. Due to the flow conditions, however, the liquid and the gaseous phases are not physically strictly separated from one another; gas bubbles are rather formed in the liquid.

In the DMFC system, the liquid phase exiting at the anode outlet is a water/methanol solution, as a rule saturated with $CO_2$; in the gaseous phase, $CO_2$ enriched with water vapour and methanol vapour is dominant. Thus, in an unregulated waste gas removal, the fuel (here: methanol) present in the gaseous phase would be thus lost for the system, which is unacceptable not only for economical, but also for health and safety reasons. Furthermore, water in the form of water vapour would be lost, so that for maintaining the operation conditions, an external water supply would be necessary, which is unacceptable with respect to the practical use of the fuel cell.

The above-mentioned problems have to be taken into consideration in the conception and operation of a DMFC system, which is conventionally done as described below.

FIG. 1 is a view of a typical fuel cell system according to the present internal prior art. The DMFC fuel cell is schematically and only for simplification divided into a cathode side K and an anode side A. ("Side" is not to be understood figuratively: in fact, a DMFC fuel cell consists, as a rule, of a so-called stack with alternating anode and cathode areas).

The fluid on the cathode side comprises an oxidising substance, such as oxygen, which is supplied by means of a metering device 1 in the form of normal ambient air.

In the process, the non-usable substances of the air, such as nitrogen, but also water arising as reaction product and $CO_2$ diffusing from the anode to the cathode side, are discharged as fluid 21 at the outlet.

The fluid on the anode side further comprises, apart from methanol, the substances water and carbon dioxide, the latter having to be discharged from the fuel cell as waste gas 15.

In the system shown in FIG. 1, two separate separating devices are provided which separate gas from the fluid 11 discharged at the anode outlet for separating $CO_2$ or and, respectively, recover water corresponding to the losses on the anode side from the fluid 21 discharged at the cathode outlet.

The recovered water 14 or the water/methanol mixture 13, respectively, is again supplied to the anode inlet of the fuel cell in a reflux 12 (by means of a pump 2), methanol M being admixed from a storage tank T via a metering pump 3. The purified waste gases 15, 16 ($CO_2$, dried exhaust air) are discharged to the surroundings.

One of the essential problems is to keep the amount of water contained in the system as constant as possible, so that the necessity of a separate water supply can be avoided. As water in the form of water vapour can be discharged with the substances to be discharged on the anode side as well as with the waste gases ("exhaust air") on the cathode side, the latter not only comprising product water (to be discharged quantitatively), but also water to be recycled to the anode side which flows from the anode to the cathode side due to the "water drag" effect, the maintenance of a constant amount of water in the fuel cell is very elaborate.

BRIEF SUMMARY

In view of these problems, it is an object of the invention to provide a fluid separating device for a plurality of various fluid flows. It is especially an object to provide a fluid separating device enabling a facilitated control of the liquid supply and the removal and purification of waste gases in a DMFC fuel cell.

These objects are achieved by the fluid separating device having the features of claim 1. Advantageous further developments are listed in the subclaims.

The fluid separating device according to the invention comprises a lower section with a fluid feeding device and a liquid discharging device, an upper section with a fluid feeding device and a gas discharging device, a contact device which is constructed in such a manner that gas which rises from the lower section to the upper section comes into contact with liquid which sinks from the upper section to the lower section, and a measuring device for determining the quantity of liquid in the lower section and/or for determining the alteration of the amount of liquid.

The operating process of the arrangement is as follows: Liquid substances fed to the upper section or condensing therein sink downwards (in a flow or as single drops) due to the gravity effect. Gases fed to the upper section or arising therein rise upwards. In the contact device, the sinking liquid and the rising gases are brought into contact, whereby components of the gases soluble in the liquid transition into the liquid phase and are thus withdrawn from the gas stream.

The contact device is permeable to liquid, but it can at least slow down the downward motion of the liquid, e.g. by absorbing a certain amount of liquid. When the capacity for the absorption is exceeded, it permits a liquid penetration to the lower section. Thereby, the components removed from the gas stream can also be collected in a liquid reservoir in the lower section.

Gaseous substances fed to the upper section can be directly discharged via a gas discharging device from the upper section. If the supplied fluid comprises liquid as well as gaseous proportions, the gravity effect separates them physically. The gas stream penetrated from the lower to the upper section is discharged via the gas outlet (gas discharging device) of the upper section.

The amount of liquid collected in the fluid separating device can be determined by means of the measuring device for determining the amount of liquid in the liquid reservoir of the lower section. If necessary, additional measuring devices can be provided for determining the amount of water present in the contact device. In practice, this amount, however, can be assumed to be either constant or negligible, so that with the one measuring device in the lower section the amount of liquid can be sufficiently precisely determined. In many applications, especially for control methods, the absolute amount of liquid does not have to be determined. For taking appropriate measures, it can rather be sufficient to determine alterations in the amount of liquid.

In a preferred further development, the contact device of the fluid separating device comprises a sponge-like and/or porous material which is permeable to gas and liquids but can absorb and store a certain amount of liquid. Only when this amount of liquid is exceeded, liquid droplets are formed at the bottom of the material and finally fall down due to gravity.

The sponge-like and/or porous material can also occupy nearly the complete lower section. In this case, the sponge or the porous material itself forms the liquid reservoir.

In addition or as an alternative to the above-described further developments, in another preferred further development, the contact device can comprise at least one bottom opening and at least one overflow pipe. The overflow pipe preferably extends downwards far into the lower section, so that it is ensured that the lower opening of the overflow pipe is situated below the liquid level of the lower section and gas does not penetrate from the lower section to the upper section via the overflow pipe but exclusively via the at least one bottom opening. The operating conditions have to be adjusted such that the pressure in the lower section is higher than in the upper section.

In addition or as an alternative to the total amount of liquid, the proportion of a component can also be an important core value. In the intended purpose described in the introduction, this is in particular the methanol proportion in the fuel mixture. Therefore, the fluid separating device preferably comprises a measuring device for determining the amount and/or concentration of at least one liquid component.

If the determined concentration deviates from the desired one, the missing proportion can be added by metered addition at an appropriate site of the system. A direct metered addition into the liquid reservoir of the fluid separating device is particularly advantageous, so that in a preferred embodiment of the fluid separating device, a liquid feeding device ending in the lower section is provided.

In another preferred further development, in the upper section, the fluid separating device comprises means for condensing at least a part of gaseous components from the supplied fluid and/or means for evaporating at least a part of liquid components of the supplied fluid.

The first are mainly desired if no adequate condensation takes place before the supply. As an alternative or in addition, a condensation can also be effected already before the entry into the fluid separating device, for example, by means of a heat exchanger or a condensation trap. The evaporation devices can include a heating for increasing the gaseous proportion of water at the expense of the liquid one.

By these means, the amount of liquid which is supplied to the complete device via the fluid feeding device can be controlled.

Preferably, the fluid separating device comprises in its upper section means for avoiding a removal of liquid via the gas discharging device of the upper section. These means can, for example, comprise gas-permeable membranes in the gas discharging device. A suitably dimensioned, funnel-like means which prevents liquid from flowing from the lower areas of the fluid separating device into the upper gas inlet or gas outlet area, respectively, if the complete device tips over, is also advantageous.

BRIEF DESCRIPTION OF THE DRAWINGS

Below, the invention is illustrated with reference to two particularly preferred embodiments.

In the drawings.

DETAILED DESCRIPTION OF THE INVENTION

Figure 1:
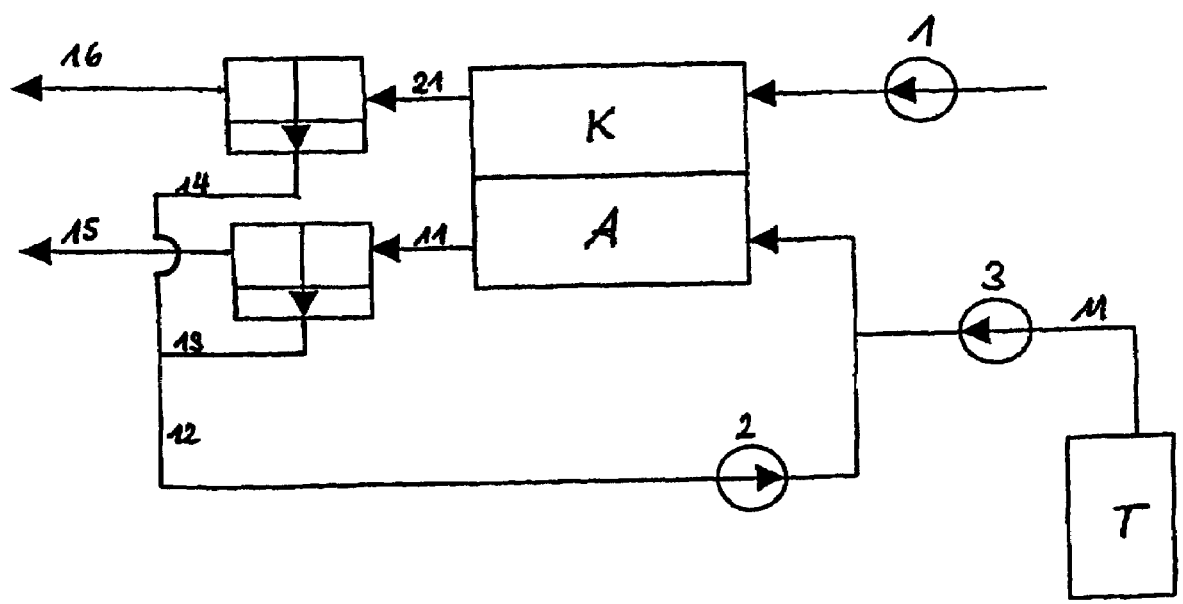
FIG. 1 shows the schematic structure of a DMFC-system (internal prior art).

FIG. 1 has already been described in the introduction. Modifications to the arrangement shown in FIG. 1 are described with reference to FIGS. 3 and 5 which show arrangements resulting from the use of preferred embodiments of the fluid separating device according to the invention.

Figure 2:
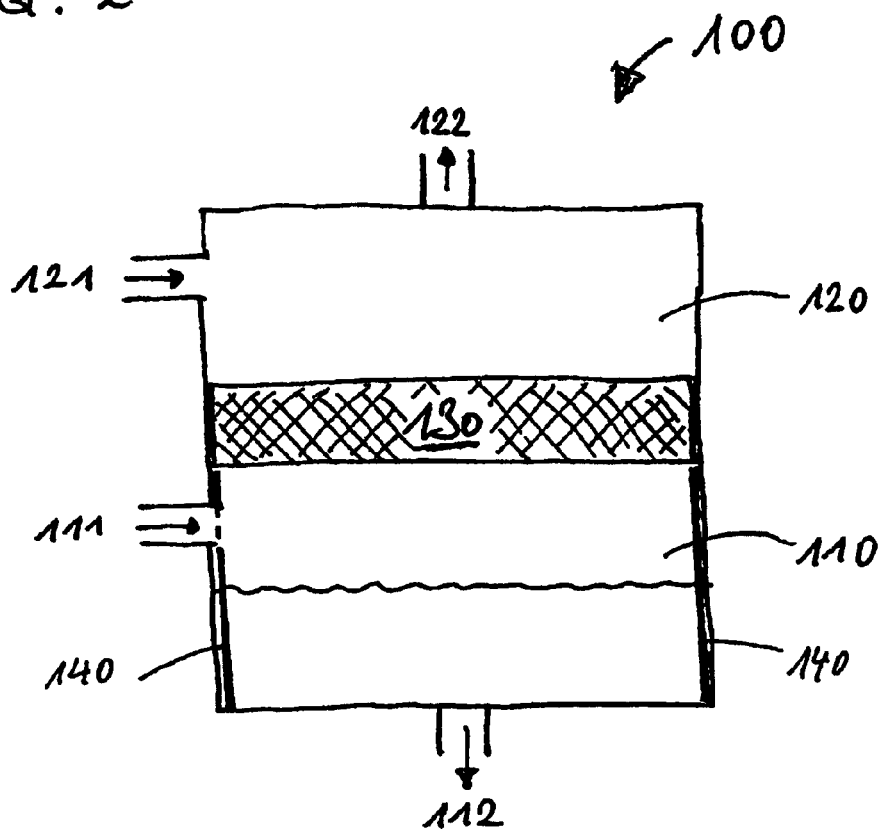
FIG. 2 shows a first preferred embodiment of the invention.

FIG. 2 shows a first preferred embodiment of the fluid separating device 100 according to the invention.

A lower section 110 comprises a fluid feeding device 111 and a liquid discharging device 112. An upper section 120 comprises a fluid feeding device 121 and a gas discharging device 122. Via the two fluid supply devices 111, 121, gases, liquids and gas/liquid mixtures can be supplied. The gas discharging device 122 is conveniently (but not necessarily) provided at the upper side of the upper section 120. This does not absolutely have to be a tubular outlet 122. The complete upper cover surface (or a part thereof can be replaced by a gas-permeable but waterproof (or at least hydrophobic) membrane, for example by a porous PTFE-foil.

The upper section 120 is separated from the lower section 110 by a sponge-like contact device 130 which is designed such that a part of liquid substances supplied to the upper section 120 via the fluid feeding device 121 or condensing in the upper section 120, is absorbed by the contact device. Only when the absorption capacity of the sponge is exceeded, drops are released at its bottom surface and fall into the liquid reservoir of the lower section 110. Gaseous substances, however, can leave the upper section 120 via the gas discharging device 122.

The fluid feeding device 121 preferably ends in a gas room of the lower section 110. To this end, it is provided at an upper area of the lower section 110. Alternatively or additionally, it can comprise a flexible tube with a float, which are designed such that fluid fed via the fluid feeding device 121 first enters the gas room of the lower section 110.

As in the upper section 120, in the lower section 110, too, the gravity causes a gas/liquid mixture fed by the fluid feeding device 121 to be separated into physically separated phases. The liquid is collected in a liquid reservoir of the lower section 110 and can be discharged via the liquid discharging device 112. Gaseous substances, however, can only escape from the lower section 110 to the upper section 120 and have to penetrate the contact device 130. In the process, components of the gas streaming upwards can be dissolved in the slowed down or collected liquid and fed to the liquid reservoir in the lower section 120 with released liquid drops. Thereby, methanol can be easily, but effectively, withdrawn from a waste gas mixture with methanol vapours and fed to the liquid reservoir situated at the bottom of the lower section 110. The purified waste gas can be discharged to the outside together with the exhaust air via the gas discharging device 122.

The alteration of the amount (or the amount itself) of the liquid collected in the reservoir can be measured by a measuring device 140. The measurement can, for example, be performed capacitively by means of two capacitor plates. If the liquid is, for example, mainly water, its dielectric constant is 80 times higher than the gaseous phase, so that alterations of the amount of liquid can be very accurately determined by means of alterations of the capacity of the capacitor arrangement. If an appropriate calibration has been conducted, absolute values can also be determined.

Below, the functions of the first preferred embodiment of the invention are illustrated with reference to FIG. 3 in the use of a DMFC system.

Figure 3:
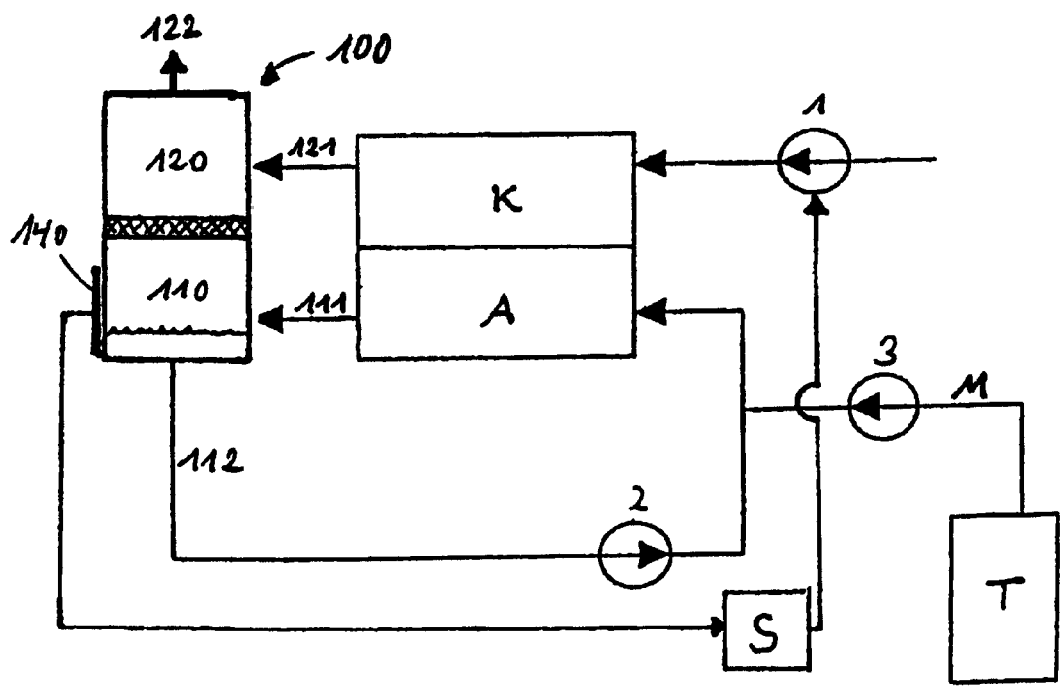
FIG. 3 shows the schematic structure of a DMFC system using the first preferred embodiment of the fluid separating device according to the invention.

In comparison with FIG. 1, in FIG. 3 the same or comparable features are provided with reference numerals increased by 100.

In DMFC fuel cells, due to an electrochemical reaction, gaseous $CO_2$ is created which has to be removed from the anode space of the fuel cells. In the gaseous phase, normally, however, there are also components of the fuel mixture, that means, for example, water vapour or methanol transitioned into the gaseous phase. The proportions of this substance depend on the respective vapour pressure, that is they are generally increased with temperature. In order to ensure a closed water circuit and avoid the discharge of fuel to the surroundings, measures have to be taken to separate these substances from the gaseous phase.

By diffusion or pulling effects (water drag), $CO_2$ and water, and also lower quantities of methanol, can penetrate the cathode space.

Thus, at the anode outlet, a fluid is discharged which comprises a liquid as well as a gaseous phase. The liquid phase is a water/methanol mixture (with water being the dominant component), in which $CO_2$ is dissolved. The gaseous phase consists of $CO_2$, water vapour and methanol vapour.

At the cathode outlet, a fluid is discharged which comprises a gaseous phase and possibly also a liquid phase. The gaseous phase essentially consists of oxygen-depleted air (exhaust air), water vapour, with lower amounts of $CO_2$. The liquid phase is essentially condensed water. For achieving a closed water supply, water may be discharged to the surroundings only in such quantities that arise as product water.

In the arrangement outlined in FIG. 3, the two separate separating devices of FIG. 1 are replaced by an embodiment of the fluid separating device 100 according to the invention.

The fluid discharged at the cathode outlet is supplied to the fluid separating device 100 via the fluid feeding device 121 of the upper section 120. The fluid discharged at the anode outlet is supplied to the fluid separating device 100 via the fluid feeding device 111 of the lower section 110. In both fluids, first a physical separation into a liquid phase and a gaseous phase is effected due to the gravity effect.

The recovered water/methanol mixture is again supplied to the anode inlet of the fuel cell via the liquid discharging device 112 (by means of pump 2), and in the process, corresponding to the amount of spent methanol, pure methanol M is admixed from a storage tank T by means of a metering pump 3. The purified waste gases ($CO_2$, exhaust air) are discharged to the surroundings via the gas discharging device 122.

For maintaining the operation, it is necessary to keep the total amount of water in the system constant within certain tolerance limits, that is, for example, to avoid an excessive (i.e. exceeding the water production) discharge of water in connection with the waste gas discharge, or vice-versa to increase the discharge in case of an increase of the amount of water.

Figure 5:
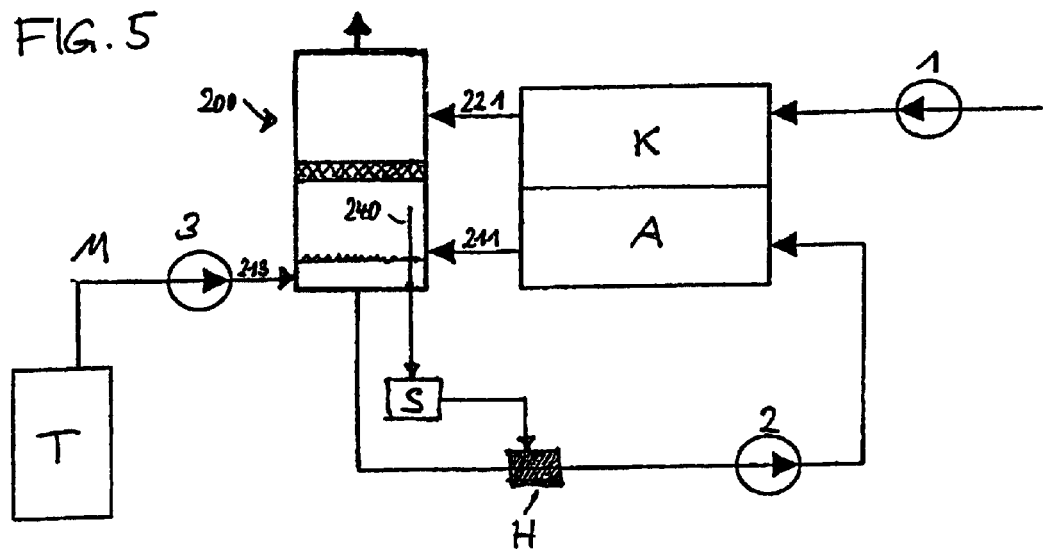
FIG. 5 shows the schematic structure of a DMFC system using the second preferred embodiment of the fluid separating device according to the invention.

In the present example, alterations of the amount of water can be tracked by means of alterations of the capacity of the measuring device 140. A controlling device S can activate the metering device 1 on the basis of these alterations in order to reduce the fluid flow on the cathode side, which effects a reduced water discharge from the system, or to increase it, which increases the water discharge. An alternative or additional control mechanism is indicated in FIG. 5 and consists of the control of the system temperature (with higher temperatures, the humidity of the gases and thus the water discharge are increased).

With the fluid separating device according to the invention, it is therefore comparably easy to fulfil the condition of a constant amount of water in the fuel cell.

Figure 4:
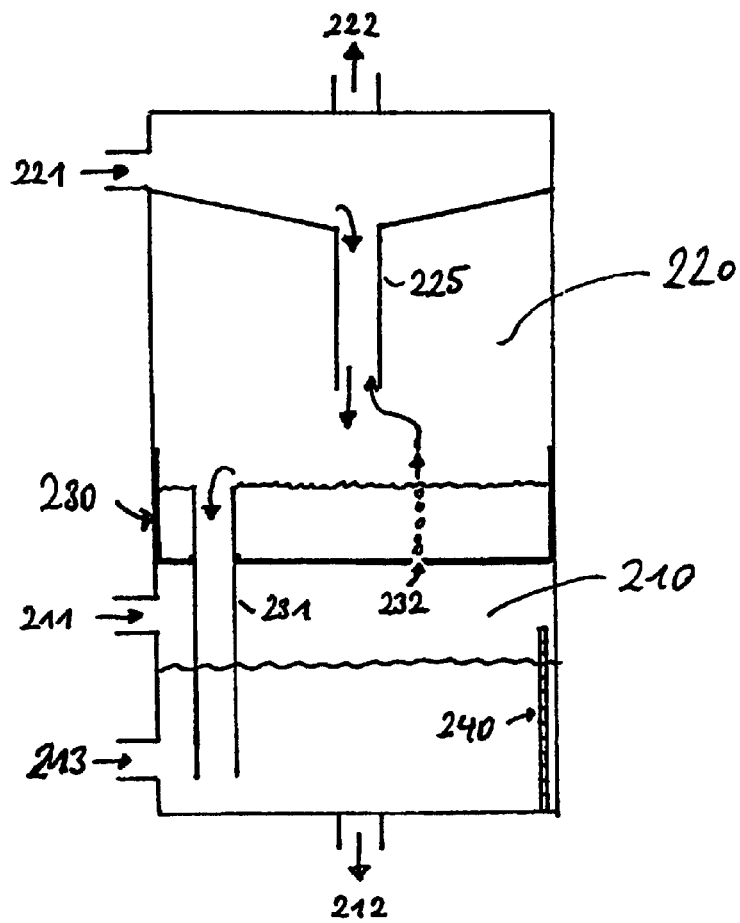
FIG. 4 shows a second preferred embodiment of the invention.

FIG. 4 shows a second preferred embodiment of the fluid separating device 200 according to the invention. In comparison with FIG. 2, the same or comparable features are provided with reference numerals increased by 100.

The lower section 210 also comprises a fluid feeding device 211 (ending in the upper area of section 210) and a liquid discharging device 112. In addition, a liquid feeding device 213 (ending in the lower area of section 210) is provided. The upper section 220 comprises, as in the embodiment which is shown in FIG. 2, a fluid feeding device 221 via which the gases, liquids and gas/liquid mixtures can be fed, as well as a gas discharging device 222 (which is arranged at the top, but can also be arranged laterally). Due to the gravity effect and the greatly reduced flow velocity and—if necessary, supported by a not shown condensing device—in the upper area of section 220, a physical separation of the gaseous and liquid phase proportions is effected, wherein the first can be discharged via the gas discharging device 222 and the latter are conducted away downwards via a funnel-like drain device 225. The funnel-shape is particularly convenient but not absolutely necessary. By an appropriate selection of the length of the funnel tube, it can be avoided that in case of a tipping of the whole device 200 liquid penetrates from the bottom to the top. Furthermore, the funnel tube can also have a contacting effect, as here liquid and gases are passing each other. This effect can even be amplified if a sponge-like absorbent material is provided in the funnel tube (method of operation as described with reference to FIG. 2). The two sections 210, 220 are separated by a tub-like contact device 230 comprising an overflow pipe 231 ending in the lower section 231, so that a part of liquid substances which are conducted downwards via the drain device 225 is collected by the contact device 230 and can flow into the lower section 210 only when a certain level is achieved (when the upper edge of the overflow pipe 231 is exceeded).

Gaseous substances which enter the lower section 210 together with the fluid supplied via the fluid feeding device 211 can escape upwards through a bore 232 in the contact device 230, but they have to pass through the liquid collected therein. In the process, gas components, such as methanol, can be dissolved and supplied to the liquid in the lower section 220 via the overflow pipe.

With the embodiments of FIGS. 2 and 4, very effective waste gas purification is possible, whereby the methanol content of the waste gases can be drastically reduced. The humidity content of the waste gases can also be greatly reduced. However, it should be kept in mind that an amount of water corresponding to the arising amount of water has to be discharged, such that the amount of water in the system does not continually increase. Therefore, the devices 100 and 200 should be dimensioned with respect to the range of application such that approximately this amount of product water is separated as water vapour with the waste gases 122 or 222, respectively, which, however, will normally be possible only approximately and not exactly. To be able to determine deviations therefrom and to take countermeasures, measuring devices 140, 240 for determining the amount of liquid or alterations of the amount of liquid are provided in the lower section.

Apart from the already mentioned examples, the countermeasure can also consist in a heating which controls the ratio of gaseous to liquid water in the fluid fed on the cathode side. Such a heating can be provided separately of and outside the fluid separating device, but it can also be integrated into the fluid separating device. Alternatively, a controllable capacitor or a heat exchanger where the discharged cathode fluid passes by can be used as a countermeasure.

In the embodiment which is shown in FIG. 4, a level meter 240 which determines the level of the liquid surface is provided as a measuring device. As the liquid is electrically conductive due to the $CO_2$ dissolved therein, the level metering can be effected by means of the conductivity: for example, electrode pairs which are short-circuited by the liquid can be provided at different levels. Alternatively, the capacities of capacitors or the alterations of the capacities can be used as measured quantity. Optical measuring methods which are based on the different optical properties of the gaseous phase and the liquid are also technically easy to realize; among these properties are: index of refraction, absorption, transmission. Thus, for example, diode pairs arranged in pairs can be provided one of which each serves as transmitter and the other one as receiver diode and by means of which one can detect whether there is any liquid between them.

The level meter 240 is preferably to be arranged and designed such that reasonable measuring results can be determined even if the orientation of the fluid separating device is not vertical. A more central arrangement is clearly preferred to the outlined lateral attachment.

By means of the fuel consumption to be determined, for example, one can determine how much fuel has to be added to the circuit flow by metering. In the present case (FIG. 4), the fuel M can be directly fed to the lower section 210 via the liquid feeding device 213, which enables a facilitated design of the anode circuit. As an alternative to the fuel consumption, the amount of the fuel M to be added by metering can be determined by measuring the fuel concentration in the liquid in the lower section 210.

FIG. 5 serves for illustrating the mode of operation of the second preferred embodiment of the invention with reference to its use in a DMFC system. With respect to FIG. 3, the same or comparable features are provided with reference numerals increased by 100.

As distinguished from FIG. 3, in this case, methanol is directly supplied from the tank T to the water/methanol mixture in the lower section of the fluid separating device 200.

The amount of pure methanol M to be added by metering can, for example, be determined by a (not shown) concentration sensor in the lower section 210 or the methanol consumption which can be calculated by means of the system efficiency.

Alterations of the amount of water can be tracked by means of the level sensor 240. A controlling device S can activate a heater H (for example provided in the anode circuit) on the basis of these alterations to correspondingly adapt the water discharge from the system: at higher temperatures, the amount of water discharged with the waste gases is increased.

In the arrangement which is shown in FIG. 5, the lower section of the fluid separating device 200 simultaneously serves as mixing chamber.

The above-described embodiments only serve for illustrating the principles underlying the invention. In particular, the fact that the second preferred embodiment (FIG. 4) of the invention comprises additional means with respect to the first one (FIG. 2), should not be construed as restricting. Of course, these additional means can also be integrated into the first embodiment, and they can also be omitted in the second embodiment. The scope of protection of the invention is exclusively defined by the following patent claims.

The invention claimed is:

1. Fluid separating device, comprising:
   a lower section with a fluid feeding device and a liquid discharging device,
   an upper section with a fluid feeding device and a gas discharging device,
   a contact device, which is provided such that gas rising from the lower section into the upper section is contacted with liquid which sinks from the upper section into the lower section, and
   a measuring device for determining the amount of liquid in the lower section and/or for determining alterations of the amount of liquid,
   wherein the contact device comprises a sponge-like and/or porous material, and
   wherein the contact device essentially occupies the complete lower section.

2. Fluid separating device, comprising:
   a lower section with a fluid feeding device and a liquid discharging device,
   an upper section with a fluid feeding device and a gas discharging device,
   a contact device, which is provided such that gas rising from the lower section into the upper section is contacted with liquid which sinks from the upper section into the lower section, and
   a measuring device for determining the amount of liquid in the lower section and/or for determining alterations of the amount of liquid,
   wherein the contact device comprises a sponge-like and/or porous material, and wherein the contact device comprises at least one bottom opening and at least one overflow pipe.

3. Fluid separating device, comprising:
a lower section with a fluid feeding device and a liquid discharging device,
an upper section with a fluid feeding device and a gas discharging device,
a contact device, which is provided such that gas rising from the lower section into the upper section is contacted with liquid which sinks from the upper section into the lower section, and
a measuring device for determining the amount of liquid in the lower section and/or for determining alterations of the amount of liquid,
wherein the contact device comprises a sponge-like and/or porous material, and
a liquid feeding device ending in the lower section.

4. Fluid separating device according to claim 1, in which the upper section comprises means for avoiding a discharge of liquid through the gas discharging device of the upper section.

5. Fluid separating device according to claim 1, in which the contact device comprises at least one bottom opening and at least one overflow pipe.

6. Fluid separating device according to claim 3, comprising a measuring device for determining the amount and/or the concentration of at least one liquid component.

7. Fluid separating device according to claim 1, comprising a measuring device for determining the amount and/or the concentration of at least one liquid component.

8. Fluid separating device according to claim 2, comprising a measuring device for determining the amount and/or the concentration of at least one liquid component.

9. Fluid separating device according to claim 1, comprising a liquid feeding device ending in the lower section.

10. Fluid separating device according to claim 2, comprising a liquid feeding device ending in the lower section.

11. Fluid separating device according to claim 1, in which the upper section comprises means for condensing at least a part of gaseous components of the supplied fluid and/or evaporating at least a part of liquid components of the supplied fluid.

12. Fluid separating device according to claim 2, in which the upper section comprises means for condensing at least a part of gaseous components of the supplied fluid and/or evaporating at least a part of liquid components of the supplied fluid.

13. Fluid separating device according to claim 3, in which the upper section comprises means for condensing at least a part of gaseous components of the supplied fluid and/or evaporating at least a part of liquid components of the supplied fluid.

14. Fluid separating device according to claim 3, in which the upper section comprises means for avoiding a discharge of liquid through the gas discharging device of the upper section.

15. Fluid separating device according to claim 2, in which the upper section comprises means for avoiding a discharge of liquid through the gas discharging device of the upper section.

* * * * *